United States Patent [19]

Doran et al.

[11] Patent Number: 4,836,677

[45] Date of Patent: Jun. 6, 1989

[54] RING LASER CAVITY LENGTH CONTROL MIRROR ASSEMBLY

[75] Inventors: Robert A. Doran, Oakland; Joseph P. Ficalora, Oak Ridge, both of N.J.

[73] Assignee: Allied-Signal Inc., Morris Township, N.J.

[21] Appl. No.: 97,563

[22] Filed: Sep. 16, 1987

[51] Int. Cl.[4] .................. G01C 19/64; H01L 41/10
[52] U.S. Cl. .............................. 356/350; 310/328; 310/369; 372/107
[58] Field of Search ............... 356/350; 372/94, 99, 372/107; 310/328, 369; 350/487, 632

[56] References Cited

U.S. PATENT DOCUMENTS

| 4,113,387 | 9/1978 | Shutt | 356/350 |
| 4,160,184 | 7/1979 | Ljung | 310/369 X |
| 4,383,763 | 5/1983 | Hutchings et al. | 356/350 |
| 4,639,630 | 1/1987 | Rodloff et al. | 310/328 |

Primary Examiner—Vincent P. McGraw
Attorney, Agent, or Firm—Howard G. Massung

[57] ABSTRACT

A cavity length control assembly for a ring laser gyro includes a mirror support to which a piezoelectric plate is mounted. The piezoelectric plate is mounted at a center post of the mirror support with a preload tension. An outer perimeter of the piezoelectric plate is supported against the perimeter of the mirror support, thereby permitting the piezoelectric plate to exert axial force against the perimeter, without being radially restrained at the perimeter.

5 Claims, 3 Drawing Sheets

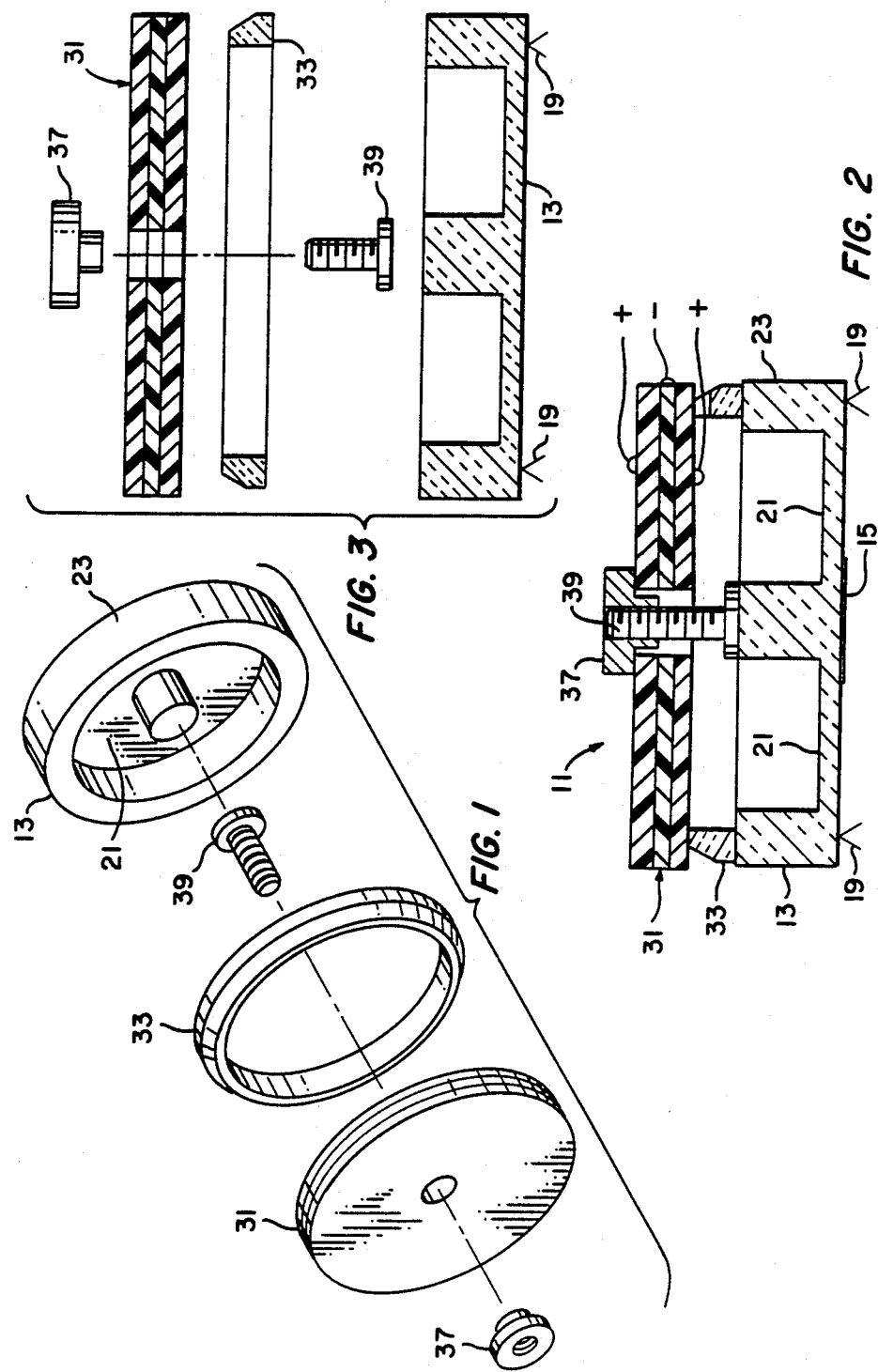

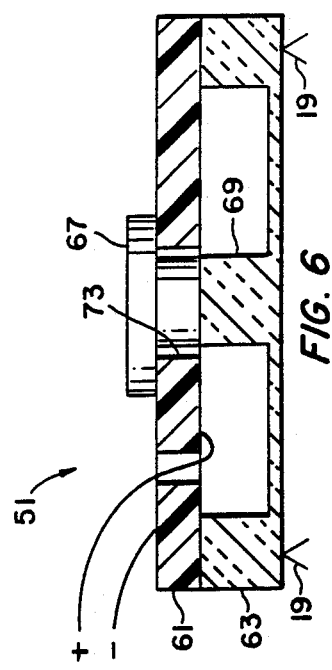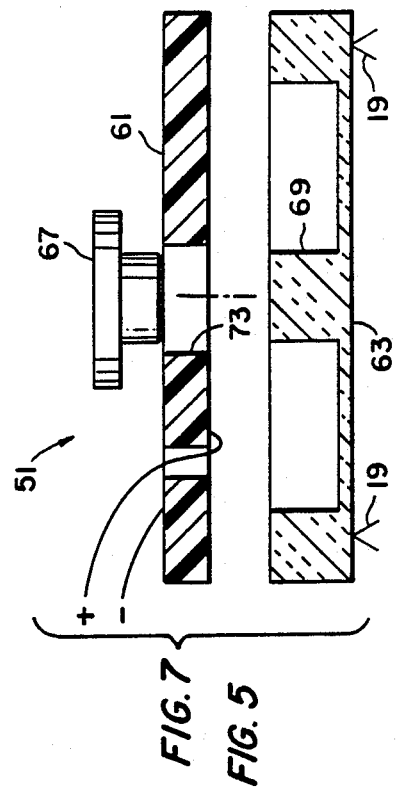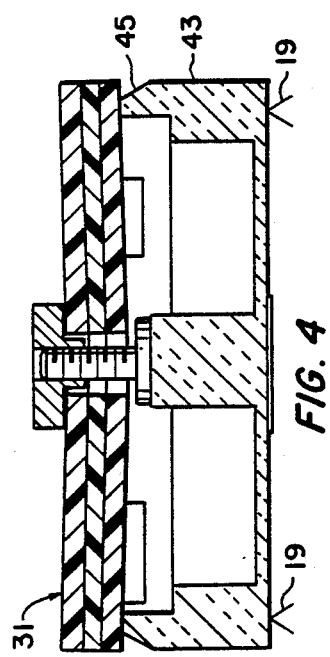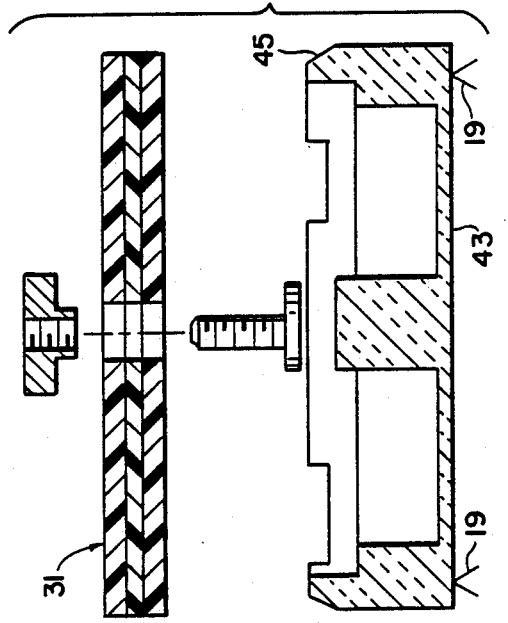

RING LASER CAVITY LENGTH CONTROL MIRROR ASSEMBLY

FIELD OF THE INVENTION

This invention relates to optical interferometers such as ring laser gyros, in which a mirror assembly is deflected by a slight amount in order to modulate light. More specifically, the invention relates to a mirror assembly in a ring laser gyroscope which permits the mirror to be deflected in order to achieve cavity length control.

BACKGROUND OF THE INVENTION

Ring laser gyroscopes measure rate by detecting phase shifts (called Sagnac phase shifts) in counter-rotating beams of light. The light rotates within a cavity which includes a lasing element. It is important that the cavity length be maintained to a certain degree of accuracy, preferably, within 0.001 $\lambda$, or less. In one configuration, this is effected by mounting a mirror to a piezoelectric (PZT) element. Path length adjustment is accomplished by applying a DC voltage to the PZT material.

Additionally, it is desired to apply an AC modulation, or modulation dither, to the cavity length control. This is done in order to search for a resonant mode of operation. This dither modulation is accomplished by adding an AC component to the voltage applied to the PZT material.

The expansion of the ring laser's frame due to temperature deviation is relatively small (2.7 $\lambda$), compared to the expansion of a prior art cavity length control housing assembly (8.2 $\lambda$), so that a cavity length control design with minimal temperature expansion is desirable. If the expansion of the cavity length control housing assembly is reduced, the total range required is also reduced. The tilt of the cavity length control is due to inconsistencies in the expansion of the PZT material and the adhesive bond. Hysteresis problems are due to the residual deformation of the PZT/housing adhesive bond over voltage and temperature.

It is therefore desired to provide a cavity length control arrangement whereby deviation as a result of thermal changes is minimized, thereby increasing the frequency stability of the cavity.

SUMMARY OF THE INVENTION

In accordance with the present invention, a mirror is supported on a piezoelectric disc by means of a center support carrier button and a perimetric support structure. The support carrier button passes through the disc and is affixed to the mirror assembly. In order to achieve cavity length control, the piezoelectric disc is energized by DC and AC voltages. The piezoelectric disc exerts force against the mirror assembly through the supporting button and the support structure. Radial forces which would occur through thermal expansion and contraction are avoided by the disc sliding along the support structure. Materials which have normal thermal expansion and contraction characteristics, expansion and contraction can be permitted to freely occur. Piezoelectric distortion on the other hand, causes the PZT disc to distort and thereby shift the assembly in accordance with modulation of the PZT disc.

BRIEF DESCRIPTION OF THE DRAWINGS

FIG. 1 is a cross-axial view of a first embodiment of a cavity length control assembly constructed in accordance with the invention. The mirror and mounting locations for the assembly are at the bottom of the figure.

FIG. 2 is a perspective view of the assembly of FIG. 1.

FIG. 3 is an assembly drawing of the assembly of FIG. 1, showing the individual parts.

FIGS. 4 and 5 are cross-axial views of an alternate embodiment of a cavity length control assembly constructed in accordance with the invention. The mirror and mounts for the assembly are at the bottom of the drawing.

FIGS. 6 and 7 show an alternate embodiment of the invention in which a simplified configuration of the components are used.

DETAILED DESCRIPTION OF THE PREFERRED EMBODIMENTS

Figure 8:
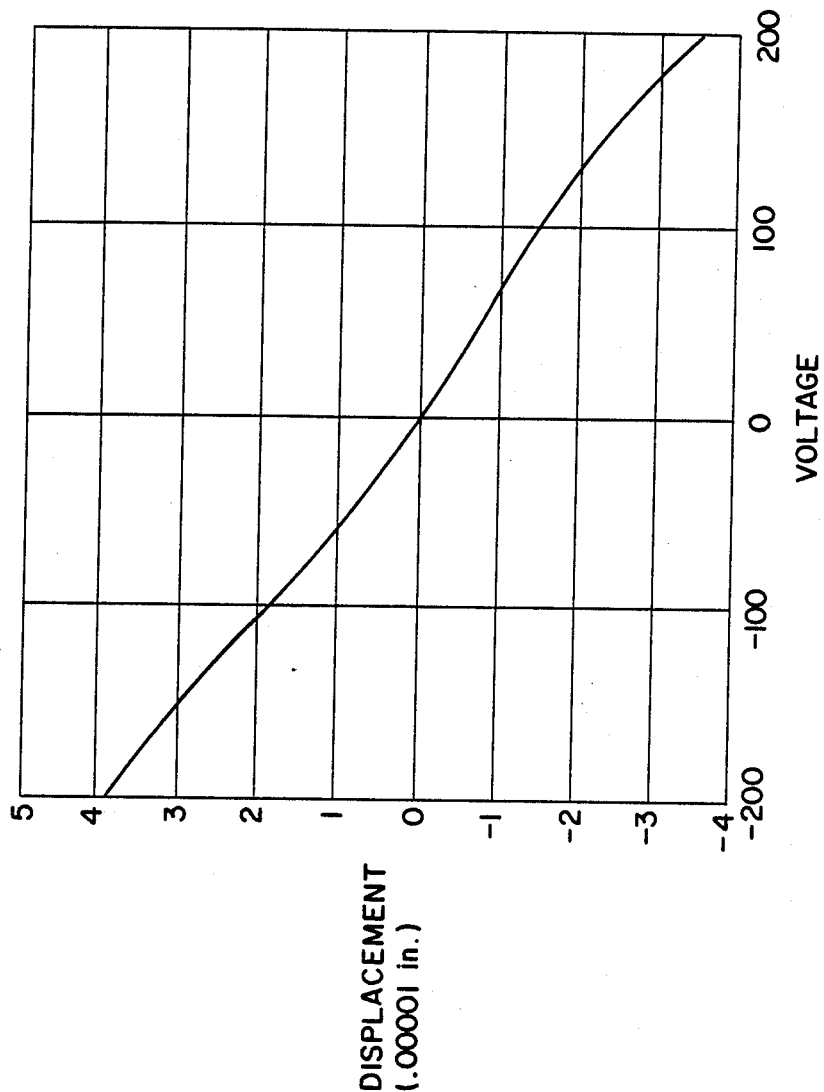
FIG. 8 is a graph showing the deflection of the assembly of FIG. 6 in response to electromotive force (EMF).

Referring to FIG. 1, a cavity length control assembly 11 includes a mirror plate 13 upon which a reflective layer 15 is deposited. The assembly 11 is mounted as part of a cavity of a ring laser gyro (not shown). Support is generally at the mirror plate 13, along the same surface 17 as the mirror coating 15. Support for the assembly 11 is symbolically represented at 19, where the mirror plate 13 is maintained in position against the ring laser frame by Van der Walls forces. The mirror plate 13 has a cylindrical cross-section.

A greater portion of the mirror plate 13 is thin, as at 21, permitting the part of the mirror plate with the mirror coating 15 to deflect with respect to the mirror plate's outer parameter 23, which is supported at 19. It is contemplated that the mirror plate 13 will deflect axially, so that the mirrored surface 15 is deflected with respect to the support at 19.

In order to accomplish this deflection, a piezoelectric wafer 31 is caused to deflect. In the instant embodiment, the piezoelectric wafer 31 is bimorphic, so that it may distort in opposite directions, as desired. The piezoelectric wafer 31 is generally disc shaped and is supported along its outer edge by a spacer 33. A button 37 functions as a nut for a stud 39, which connects the center of the mirror plate 13 with the piezoelectric wafer 31. The button 37 is bonded to the piezoelectric wafer 31, and the stud 39 is bonded to the mirror plate 13, as is the spacer 33. In order to complete assembly, the wafer 31, with its button 37, are threaded onto the stud 39 until the wafer 31 reaches the spacer 33. The wafer 31 is then further threaded to preload the wafer 31 against the spacer 33, thus completing the assembly. FIGS. 4 and 5 show an arrangement in which a mirror plate 43 is constructed with a supporting ring 45 is an intergal portion thereof. The assembly sans separate supporting ring eliminates the bonding joint between the supporting ring and the mirror plate.

Since the piezoelectric plate 31 is preloaded against the mirror plate 13 or 43, it is possible to construct a cavity length control assembly 51 as shown in FIGS. 6-7, in which a piezoelectric disc 61 is not bimorphic, but instead deflects only in a single direction in response to EMF. This limits the range of the disc 61, but the limited range may be inconsequential in some applications. Piezoelectric disc 61 is secured against a mirror plate 63 by bonding a securing button 67 directly to center post 69 on the mirror plate 63. In the embodiment shown, the piezoelectric disc 61 has a center opening 73 which permits it to clear the center post 69. Temperature compensation requirements are reduced due to expansion of the button 67 counteracting expansion of the disc 61. The button 67 can be matched to the disc 61 to have the button's expansion coincide with the axial displacement of the disc 61 due to the thermal expansion.

The displacement in a single direction of the mirror requires that a neutral position be established by electrically biasing the disc 61. This would not hurt performance because, as shown in FIG. 8, response of the disc 61 tends to be fairly linear.

In order to secure the component parts to one another, bonding techniques are used. A preferred bonding material for fixing the button 37 or 67 to the piezoelectric disc 31 or 61 is Abelstik 212-12 or Abelstik 931-1, manufactured by Abelstik Laboratories, Gardenia, Ca. Bonding of the stud 39 to the mirror plate 13 and bonding of the spacer ring 33 to the mirror plate 13 is preferably accomplished with Abelstick 931-1. Bonding of the piezoelectric disc 61 to the mirror plate 65 is also preferably done with Abelstick 931-1. In the preferred embodiment, the cavity length control assemblies of FIGS. 1-5 are 20 mm in diameter and have a thickness of approximately 6 mm. The anticipated range of axial deflection of the assemblies are approximately 0.5 microns. The preferred preload for these assemblies is approximately half of that or 0.25 microns.

The embodiment of FIGS. 6-7 would have a similar range of deflection, but would be preloaded to the full range of deflection.

The embodiments of FIGS. 1-5 allows the preloaded wafer 31 to be connected in either a parallel circuit or a series circuit. In the parallel circuit, which is preferred, the two sides of the wafer 31 are energized 180° out of phase with one another. In a series connection, the two sides would be operated in phase, thus requiring twice the EMF as the parallel circuit.

What has been described are specific embodiments of the invention. Clearly, modification of the configurations are possible and likely.

We claim:

1. Ring laser in which a mirror assembly has an optical path length adjustment feature characterized by:
    (a) a frame having a ring laser cavity therein:
    (b) a mirror support comprising a front surface normal to a center axis of mirror deflection and rearwardly facing extensions, the front surface having a center portion and a perimetric portion;
    (c) the rearwardly facing extension including a perimetric extension capable of communicating axial force about a perimeter of the mirror support and including a center post capable of communicating axial force along the center axis;
    (d) the mirror support being capable of distorting so that a center portion of the front surface axially shifts with respect to the perimetric section of the front surface;
    (e) a piezoelectric plate;
    (f) means to axially support the piezoelectric plate against the perimetric extension, said means contacting the piezoelectric plate along a surface of the plate which is substantially normal to the center axis, without restraining the piezoelectric plate radially;
    (g) tension means, the tension means fixing the piezoelectric plate to the center post and applying an axial preload to the plate against the means to axially support the piezoelectric plate to the perimetric extension;
    (h) electrical means to cause the piezoelectric plate to deflect, said deflection changing axial force applied by the piezoelectric plate against the mirror support;
    (i) a mirror located at the center portion;
    (j) means to mount the mirror support to the frame within the cavity in a manner which places the mirror within an optical path of the ring laser, the means to mount being located at the perimetric portion of the front surface.

2. Ring laser as described in claim 1, further characterized by:
    the tension means being bonded to the center post.

3. Ring laser as described in claim 1, further characterized by:
    the piezoelectric plate being a bimorphic structure, wherein the preload establishes a neutral position and EMF can be applied in two different manners in order to cause the piezoelectric plate to distort in opposite directions from the neutral positions.

4. Ring laser as described in claim 1, further characterized by:
    the piezoelectric plate responding to EMF by distorting in one direction, the distortion increasing the tension applied to the center post by the preload.

5. Ring laser as described in claim 1, further characterized by:
    the means to axially support being selected to have a thermal expansion which matches that of the piezoelectric plate in a direction of axial deflection.

* * * * *